United States Patent
Levesque et al.

(10) Patent No.: US 9,729,730 B2
(45) Date of Patent: Aug. 8, 2017

(54) SYSTEMS AND METHODS FOR PERCEPTUAL NORMALIZATION OF HAPTIC EFFECTS

(71) Applicants: Vincent Levesque, Montreal (CA); Ali Modarres, Montreal (CA); Neil Olien, Montreal (CA); Danny Grant, Laval (CA); Erin Ramsay, Dollards-des-Ormeaux (CA); David Birnbaum, Oakland, CA (US); Amaya Weddle, San Jose, CA (US)

(72) Inventors: Vincent Levesque, Montreal (CA); Ali Modarres, Montreal (CA); Neil Olien, Montreal (CA); Danny Grant, Laval (CA); Erin Ramsay, Dollards-des-Ormeaux (CA); David Birnbaum, Oakland, CA (US); Amaya Weddle, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 537 days.

(21) Appl. No.: 13/933,915

(22) Filed: Jul. 2, 2013

(65) Prior Publication Data
US 2015/0009168 A1    Jan. 8, 2015

(51) Int. Cl.
*G06F 3/041* (2006.01)
*H04M 19/04* (2006.01)
(Continued)

(52) U.S. Cl.
CPC ............ *H04M 19/04* (2013.01); *G06F 3/016* (2013.01); *G06F 3/04883* (2013.01); *G06F 3/044* (2013.01)

(58) Field of Classification Search
CPC ...................................................... G06F 3/016
See application file for complete search history.

(56) References Cited

U.S. PATENT DOCUMENTS 7,924,144 B2    4/2011  Makinen et al.
7,982,588 B2    7/2011  Makinen et al.
(Continued)

FOREIGN PATENT DOCUMENTS

EP         1 524 586         4/2005

OTHER PUBLICATIONS

European Patent Office, Extended European Search Report, European Application No. 14174979, dated Nov. 3, 2014.
(Continued)

*Primary Examiner* — Antonio Xavier
*Assistant Examiner* — Shawna Stepp Jones
(74) *Attorney, Agent, or Firm* — Kilpatrick Townsend & Stockton LLP (57) ABSTRACT

Systems and methods for perceptual normalization of haptic effects are disclosed. One system may include a first sensor configured to detect a user interaction with a touch surface and transmit a first sensor signal associated with the user interaction; a second sensor configured to detect a feature associated with the touch surface and transmit a second sensor signal associated with the feature; a processor in communication with the first sensor and the second sensor, the processor configured to: determine a first haptic effect based on the user interaction; determine a modified haptic effect based in part first haptic effect and on the feature; output a haptic signal associated with the modified haptic effect; and a haptic output device in communication with the processor and coupled to the touch surface, the haptic output device configured to receive the haptic signal and output the modified haptic effect to the touch surface.

24 Claims, 7 Drawing Sheets

(51) Int. Cl.
  *G06F 3/01* (2006.01)
  *G06F 3/0488* (2013.01)
  *G06F 3/044* (2006.01)

(56) References Cited

U.S. PATENT DOCUMENTS

| | | |
|---|---|---|
| 8,026,798 B2 | 9/2011 | Makinen et al. |
| 8,462,125 B2 | 6/2013 | Birnbaum et al. |
| 8,587,417 B2 | 11/2013 | Birnbaum et al. |
| 8,638,301 B2 | 1/2014 | Birnbaum et al. |
| 2005/0240778 A1* | 10/2005 | Saito .............. 713/186 |
| 2006/0017691 A1* | 1/2006 | Cruz-Hernandez ..... G06F 3/016 345/156 |
| 2007/0236450 A1* | 10/2007 | Colgate .......... G06F 3/016 345/156 |
| 2009/0109021 A1* | 4/2009 | Paoletti et al. .......... 340/540 |
| 2010/0017489 A1 | 1/2010 | Birnbaum et al. |
| 2010/0017759 A1 | 1/2010 | Birnbaum et al. |
| 2010/0085169 A1 | 4/2010 | Poupyrev et al. |
| 2010/0214243 A1 | 8/2010 | Birnbaum et al. |
| 2010/0231367 A1 | 9/2010 | Cruz-Hernandez et al. |
| 2010/0231508 A1 | 9/2010 | Cruz-Hernandez et al. |
| 2010/0231539 A1 | 9/2010 | Cruz-Hernandez et al. |
| 2010/0231540 A1 | 9/2010 | Cruz-Hernandez et al. |
| 2010/0231541 A1 | 9/2010 | Cruz-Hernandez et al. |
| 2010/0231550 A1* | 9/2010 | Cruz-Hernandez et al. . 345/174 |
| 2012/0229400 A1 | 9/2012 | Birnbaum et al. |
| 2012/0268412 A1 | 10/2012 | Cruz-Hernandez et al. |
| 2013/0057509 A1 | 3/2013 | Cruz-Hernandez et al. |
| 2014/0118127 A1 | 5/2014 | Levesque et al. |
| 2014/0139448 A1 | 5/2014 | Levesque et al. |
| 2014/0139450 A1 | 5/2014 | Levesque et al. |
| 2014/0139451 A1 | 5/2014 | Levesque et al. |
| 2014/0139452 A1 | 5/2014 | Levesque et al. |
| 2014/0253302 A1 | 9/2014 | Levesque et al. |
| 2014/0267069 A1 | 9/2014 | Dionne |

OTHER PUBLICATIONS

Google I/O 2012—For Butter or Worse: Smoothing Out Performance in Android UIs, Published on Jun. 29, 2012, web page at http://www.youtube.com/watch?v=Q8m9sHdyXnE.

European Patent Office, Communication Pursuant to Article 94(3) EPC, Application No. 14174979 dated Nov. 30, 2015.

* cited by examiner

SYSTEMS AND METHODS FOR PERCEPTUAL NORMALIZATION OF HAPTIC EFFECTS

FIELD OF THE INVENTION

The present invention generally relates to haptic feedback and more particularly to systems and methods for perceptual normalization of haptic effects.

BACKGROUND

Touch enabled devices have become increasingly popular. For instance, mobile and other devices may be configured with touch-sensitive displays so that a user can provide input by touching portions of the touch-sensitive display. As another example, a touch enabled surface separate from a display may be used for input, such as a trackpad, mouse, or other device. Furthermore, some touch-enabled devices make use of haptic effects, for example, haptic effects configured to simulate a texture or a friction on a touch-surface. This type of haptic effect can be used to provide information to the user. However, at times other factors can impact the user's perception of these effects, thus there is a need to compensate for these factors.

SUMMARY

Embodiments of the present disclosure include devices featuring surface-based haptic effects that simulate one or more features in a touch area. These haptic effects may include, but are not limited to, changes in texture, changes in coefficient of friction, and/or simulation of boundaries, obstacles, or other discontinuities in the touch surface that can be perceived through use of an object in contact with the surface. Devices including surface-based haptic effects may be more user friendly and may provide a more compelling user experience.

In one embodiment, a system of the present disclosure may comprise a first sensor configured to detect a user interaction with a touch surface and transmit a first sensor signal associated with the user interaction; a second sensor configured to detect a feature associated with the touch surface and transmit a second sensor signal associated with the feature; a processor in communication with the first sensor and the second sensor, the processor configured to: determine a first haptic effect based on the user interaction; determine a modified haptic effect based in part first haptic effect and on the feature; output a haptic signal associated with the modified haptic effect; and a haptic output device in communication with the processor and coupled to the touch surface, the haptic output device configured to receive the haptic signal and output the modified haptic effect to the touch surface.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Device for Providing Perceptual Normalization of Haptic Effects One illustrative embodiment of the present disclosure comprises a computing system such as a smartphone, tablet, or portable music device. The computing system can include and/or may be in communication with one or more sensors, such as an accelerometer, as well as sensors (e.g., optical, resistive, or capacitive) for determining a location of a touch relative to a display area corresponding in this example to the screen of the device.

As the user interacts with the device, one or more haptic output devices, for example, actuators are used to provide tactile effects. For example, a haptic effect may be output to simulate the presence of a texture on the surface of the device. In one such embodiment, as the user's finger moves across the surface, a vibration, electric field, or other effect may be output to simulate the feeling of a texture on the surface of the device. Similarly, in another embodiment, as the user moves a finger across the device, the perceived coefficient of friction of the screen can be varied (e.g., increased or decreased) based on the position, velocity, and/or acceleration of the finger or the length of time the finger has been in contact with the device. In still other embodiments, the device may vary friction based on time. For example, in some embodiments, haptic effects may be output for a certain period of time (e.g., 50 ms) when a certain event occurs, such as crossing a boundary on a touch surface. In other embodiments, the haptic effect may vary with a fixed period, e.g., in an embodiment, a texture may be output that varies at a 100 Hz rate, e.g., a 100 Hz sinusoid.

In some embodiments, the haptic effect may be associated with factors such as the current state of the system (e.g., the state of hardware such as the battery, signal strength, processor load, or memory capacity) or the state of software executing on the system (e.g., whether a process is complete, the amount of time left to complete a process, whether a process is available, or some other state associated with software executing on the device). In some embodiments, the haptic effect may vary the coefficient of friction, and depending on how the friction is varied, the user may perceive a feature in the touch surface that would not otherwise be perceived in the same manner (or at all) if the surface friction were not varied. As a particular example, the friction may be varied so that the user perceives a bump, border, or other obstacle corresponding to an edge of an on-screen button.

As the user interacts with the device, certain features may impact the user's perception of the haptic effect. For example, some users may press their fingers on the display harder than other users. Thus, these users may perceive the haptic effect differently than other users. For example, a user may apply so much pressure that the user "overpowers" the haptic effect, and thus is not able to feel the intended effect. Similarly a user may have such a soft touch that the user cannot perceive the intended haptic effect. Further, in some embodiments, other features may impact the user's perception of the haptic effects. For example, in some embodiments environmental conditions may impact the user's perception of haptic effects. For example, the current temperature, humidity, or atmospheric pressure may impact the user's perception of haptic effects. Further if the user is currently moving (e.g., in a car, on a train, boat, or airplane) this may impact the user's perception of haptic effects. Similarly, other vibrations, such as audible noises may impact haptic effects.

In some embodiments, factors may be distracting to the user, and therefore impact (e.g., reduce or increase) the user's perception of the haptic effect. For example, in some embodiments, audible noises, vibrations, environmental factors, accelerations, or other factors may distract the user's attention from the device, and therefore hinder the user's perception of the haptic effect. Alternatively, in some embodiments factors may directly affect the haptic effect, e.g., in some embodiments factors such as environmental conditions may have a direct impact on the perception of haptic effects.

Accordingly, the illustrative device may comprise a sensor configured to detect one or more features that impact the user's perception of haptic effects or distract the user from haptic effects. For example, the illustrative device may comprise a pressure sensor configured to detect how much force the user is applying to the surface of a touch screen display (e.g., how hard the user is pressing). Further, the illustrative device may comprise one or more environmental sensors (e.g., thermometers, humidistats, barometers, electric field sensors, magnetic field sensors, vibration sensors, noise sensors, etc.) configured to detect environmental conditions. Similarly, the illustrative device may comprise a sensor configured to detect motion or acceleration of the mobile device. In still other embodiments, the sensor may comprise a network interface configured to receive data from a database of data associated with various features. For example, in one embodiment, the sensor may comprise a network interface configured to access a database of environmental data or a database of terrain data. In still other embodiments, the sensor may be configured to detect the presence of a connection between the user and an electrical ground (e.g., detect whether the user is grounded).

Based on signals received from these sensors the illustrative device may determine a modified haptic effect configured to compensate for the feature. For example, if the illustrative device detects that the user is pressing harder than a certain threshold, the illustrative device may determine a stronger haptic effect configured to compensate for this additional pressure. Further, in one embodiment, a humidity sensor may determine that the illustrative device is in a very humid environment. In such an embodiment, the illustrative device may modify the haptic signal to be of a higher intensity, in order to overcome any effects of the additional humidity. Similarly, the illustrative device may detect and compensate for many other features, including, but not limited to: magnetic fields, electric fields, acceleration, vibrations, environmental conditions (e.g., temperature, humidity, wind speed, or air pressure), altitude, movement, or location.

Further, in some embodiments that implement electrostatic based effects, the power required to fully perceive the effect may be associated with the quality of the connection between the user and electrical ground. For example, in some embodiments when the user is fully grounded (e.g., by touching a metal case that is connected to ground) the electrostatic haptic effect may need to be at only half power for the user to fully perceive the effect. Further in such an embodiment, when the user is not fully grounded (e.g., the user is not touching the metal case) the haptic effect may need to be at double the power). In some embodiments, the electrical ground may not comprise earth ground. Rather, in some embodiments, the user may be in electrical contact with the ground of the handheld device. In some embodiments, this ground may be "floating." For example, in some embodiments, the electrical ground of the mobile device may not be connected to earth ground.

As will be discussed in further detail below, any number of features may impact the user's perception of haptic effects. Embodiments of the present disclosure provide systems and methods for compensating for these features to provide more compelling haptic effects.

Illustrative Systems for Providing Perceptual Normalization of Haptic Effects

Figure 1A:
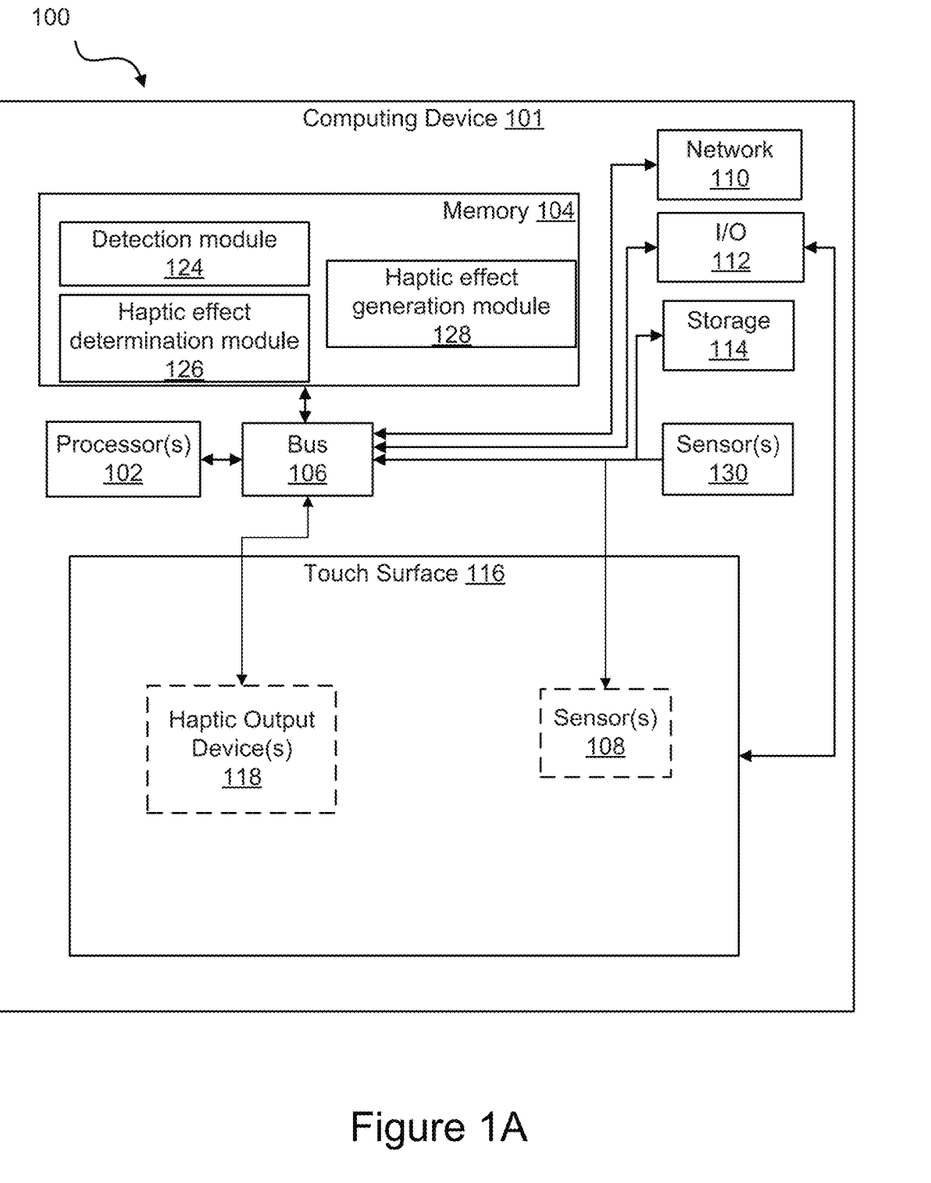
FIG. 1A shows an illustrative system for providing perceptual normalization of haptic effects.

FIG. 1A shows an illustrative system 100 for providing perceptual normalization of haptic effects. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network(s)).

I/O components 112 may be used to facilitate connection to devices such as one or more displays, keyboards, mice, speakers, microphones, cameras, and/or other hardware used to input data or output data. Storage 114 represents non-volatile storage such as magnetic, optical, or other storage media included in device 101.

System 100 further includes a touch surface 116, which, in this example, is integrated into device 101. Touch surface 116 represents any surface that is configured to sense touch input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position. In some embodiments, sensor 108 and touch surface 116 may comprise a touch screen or a touch-pad. For example, in some embodiments, touch surface 116 and sensor 108 may comprise a touch screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor is in communication with a single sensor 108, in other embodiments, the processor is in communication with a plurality of sensors 108, for example, a first touch screen and a second touch screen. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal.

System 100 further comprises sensor 130 configured to detect a feature. In some embodiments the feature may comprise a feature associated with touch surface 116. For example, in one embodiment, the feature may comprise the pressure the user applies to the touch surface 116. In such an embodiment, sensor 130 may detect the downward pressure the user applies to the touch surface 116. In another embodiment, sensor 130 may detect the area of the user's contact with touch surface 116 (e.g., how many square cm of the user's finger makes contact with the touch surface 116). In some embodiments, the sensor 130 may comprise a sensor configured to detect specific conditions associated with the touch surface 116. For example, in some embodiments, the sensor may comprise a sensor configured to detect the current temperature of the touch surface 116. In another embodiment, the sensor may comprise a sensor configured to detect the presence of moisture on the surface of touch surface 116. In other embodiments, the sensor 130 may comprise a sensor configured to detect the presence of other substances on the surface of touch surface 116 (e.g., a screen protector, oil, glue, finger smears, or other substances that may be found on the surface of a touch surface). In some embodiments, sensor 130 may comprise a sensor configured to detect other details associated with the touch surface (e.g., its age, the substance it is made from, the manufacturer, its programming, its weight, its thickness, its size, or other characteristics associated with a touch surface). In another embodiment, the sensor 130 may comprise a sensor configured to detect the condition of the user, e.g., the temperature of the user's finger, the presence of moisture on the user's finger, a substance on the user's finger (e.g., glue, syrup, oil, or a cosmetic or pharmaceutical product), or a barrier to the user's finger (e.g., a glove). In another embodiment, sensor 130 may comprise a sensor configured to detect the dryness or hydration of the user's skin. For example, in some embodiments, the sensor 130 may comprise a sensor configured to measure the hydration of the outer layer of the epidermis (e.g., the stratum corneum). In some embodiments, the sensor 130 may comprise a sensor, such as a corneometer, configured to detect changes in the capacitance of the user's skin. In some embodiments, these changes in capacitance may be used to determine the level of hydration of the user's skin. In still another embodiment, the sensor 130 may comprise a sensor configured to detect the conductance of the user's skin, or of any substance on the surface of the user's skin (e.g., a fluid, a chemical, an oil, a cosmetic or pharmaceutical product, or a glove).

In some embodiments, sensor 130 may comprise a sensor configured to detect other factors associated with touch surface 116, such as the environment around touch surface 116. For example, in one embodiment, sensor 130 may comprise a motion sensor (e.g., a GPS sensor, accelerometer, or sensor to detect speed). In still another embodiment, sensor 130 may comprise an environmental sensor, e.g., a temperature sensor, a humidity sensor, an atmospheric pressure sensor, an electric field sensor, a magnetic field sensor, a wind speed sensor, or some other sensor configured to detect the current environmental conditions around the device 101. In still other embodiments, sensor 130 may be configured to detect interference between the touch surface 116 and the user's finger (e.g., a glove, protective barrier (such as a screen protector), oil, moisture, or some residue on the user's finger). In still another embodiment, sensor 130 may comprise a force sensor, for example, a sensor configured to detect the frictional force between the user's finger and the surface of a touch sensitive interface. In still other embodiments, rather than an independent component, sensor 130 may comprise another sensor used by device 101, e.g., sensor 130 may comprise one of I/O components 112, touch surface 116, sensor(s) 108, or haptic output device(s) 118.

In one embodiment, sensor 130 may comprise a sensor configured to detect the quality of the connection between the user and electrical ground. In some embodiments, sensor 130 may detect the quality of the connection to electrical ground by measuring electrical conductivity or capacitance. In other embodiments, sensor 130 may detect specific grounding equipment associated with the user, e.g., a case, bracelet, chair, floor, wire, or some other type of electrical ground. Further, in one embodiment, sensor 130 may comprise a measurement received from haptic output device 118, associated with the current output or voltage of an electrostatic friction display. In still other embodiments, the sensor 130 may comprise a mechanical sensor configured to detect the quality of the connection between the user and electrical ground, e.g., a switch in a bracelet or case configured to detect contact from the user.

In another embodiment, sensor 130 may comprise a network interface configured to receive data from a remote database. For example, in one embodiment, sensor 130 may comprise a network interface configured to receive environmental data from an environmental database, such as a weather service. In another embodiment, sensor 130 may comprise a network interface configured to access a database of data associated with one or more of a plurality of the factors.

Device 101 further comprises a haptic output device 118. In the example shown in FIG. 1A haptic output device 118 is in communication with processor 102 and is coupled to touch surface 116. In some embodiments, haptic output device 118 is configured to output a haptic effect simulating a texture on the touch surface in response to a haptic signal. Additionally or alternatively, haptic output device 118 may provide vibrotactile haptic effects that move the touch surface in a controlled manner. Some haptic effects may utilize an actuator coupled to a housing of the device, and some haptic effects may use multiple actuators in sequence and/or in concert. For example, in some embodiments, a surface texture may be simulated by vibrating the surface at different frequencies. In such an embodiment, haptic output device 118 may comprise one or more of, for example, a piezoelectric actuator, an electric motor, an electro-magnetic actuator, a voice coil, a shape memory alloy, an electroactive polymer, a solenoid, an eccentric rotating mass motor (ERM), or a linear resonant actuator (LRA). In some embodiments, haptic output device 118 may comprise a plurality of actuators, for example an ERM and an LRA.

Although a single haptic output device 118 is shown here, embodiments may use multiple haptic output devices of the same or different type to output haptic effects, for example, to simulate surface textures or vary the perceived coefficient of friction on the touch surface. For example, in one embodiment, a piezoelectric actuator may be used to displace some or all of touch surface 116 vertically and/or horizontally at ultrasonic frequencies, such as by using an actuator moving at frequencies greater than 20-25 kHz in some embodiments. In some embodiments, multiple actuators such as eccentric rotating mass motors and linear resonant actuators can be used alone or in concert to provide different textures, variations in the coefficient of friction, or other haptic effects.

In still other embodiments, haptic output device 118 may apply electrostatic friction or attraction, for example by use of an electrostatic surface actuator, to simulate a texture on the surface of touch surface 116. Similarly, in some embodiments, haptic output device 118 may use electrostatic attraction to vary the friction the user feels on the surface of touch surface 116. For example, in one embodiment, haptic output device 118 may comprise an electrostatic display or any other device that applies voltages and currents instead of mechanical motion to generate a haptic effect. In such an embodiment, an electrostatic actuator may comprise a conducting layer and an insulating layer. In such an embodiment, the conducting layer may be any semiconductor or other conductive material, such as copper, aluminum, gold, or silver. And the insulating layer may be glass, plastic, polymer, or any other insulating material. Furthermore, the processor 102 may operate the electrostatic actuator by applying an electric signal to the conducting layer. The electric signal may be an AC signal that, in some embodiments, capacitively couples the conducting layer with an object near or touching touch surface 116. In some embodiments, the AC signal may be generated by a high-voltage amplifier. In other embodiments the capacitive coupling may simulate a friction coefficient or texture on the surface of the touch surface 116. For example, in one embodiment, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116 or vary the coefficient of friction felt as the object moves across the surface of touch surface 116. Furthermore, in some embodiments, an electrostatic actuator may be used in conjunction with traditional actuators to vary the simulated texture on the surface of touch surface 116. For example, the actuators may vibrate to simulate a change in the texture of the surface of touch surface 116, while at the same time; an electrostatic actuator may simulate a different texture, or other effects, on the surface of touch surface 116.

One of ordinary skill in the art will recognize that, in addition to varying the coefficient of friction, other techniques or methods can be used to, for example, simulate a texture on a surface. In some embodiments, a texture may be simulated or output using a flexible surface layer configured to vary its texture based upon contact from a surface reconfigurable haptic substrate (including, but not limited to, e.g., fibers, nanotubes, electroactive polymers, piezoelectric elements, or shape memory allows) or a magnetorheological fluid. In another embodiment, surface texture may be varied by raising or lowering one or more surface features, for example, with a deforming mechanism, air or fluid pockets, local deformation of materials, resonant mechanical elements, piezoelectric materials, micro-electromechanical systems ("MEMS") elements, thermal fluid pockets, MEMS pumps, variable porosity membranes, or laminar flow modulation.

In some embodiments an electrostatic actuator may be used to generate a haptic effect by stimulating parts of the body near or in contact with the touch surface 116. For example, in some embodiments an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches the touch surface 116 and moves his or her finger on the touch surface, the user may sense a texture of prickliness, graininess, bumpiness, roughness, stickiness, or some other texture.

In some embodiments, multiple haptic output devices 118 may be used to improve power efficiency during actuation. For example, in some embodiments, haptic output device 118 may comprise both an electrostatic actuator and an ultrasonic frequency actuator. In such an embodiment, processor 102 may be configured to determine whether an ultrasonic frequency actuator or an electrostatic actuator will be more efficient for outputting a certain type of haptic effect. For example, in one embodiment, due to environmental conditions, such as ambient electric fields or high humidity; an ultrasonic frequency actuator may be more efficient at outputting a specific haptic effect. In such an embodiment, the processor 102 may make this determination, for example, based on a sensor signal received from sensor(s) 130.

Further, in some embodiments haptic output devices configured to vary the coefficient of friction of a surface consume power only when in operation. However, an electrostatic actuator may be configured only to increase the perceived coefficient of friction. Similarly, an ultrasonic frequency actuator may be configured only to reduce the coefficient of friction. In such an embodiment, using an electrostatic friction actuator may reduce power consumption in embodiments where the friction coefficient is normally low and only occasionally increased. For example, in such an embodiment, a surface with a simulated button may comprise a low friction coefficient in every location other than the location of the button. Thus, the processor 102 may apply power to an electrostatic actuator only when the user is interacting with the button. In other embodiments, the coefficient of friction may normally be high and only occasionally reduced. In such an embodiment, ultrasonic vibrations may be more efficient. For example, in one embodiment, a rough surface with a patch of ice may comprise a high coefficient of friction at every location other than the patch of ice. In such an embodiment, the processor 102 may apply power to an ultrasonic frequency actuator only when the user is interacting with the icy patch. In some embodiments these two types of actuators may be combined to support both types of effects without compromising power consumption.

Further, in some embodiments, multiple actuators may be used to both reduce and increase the coefficient of friction on touch surface 116. This may serve to increase the range of friction coefficients that haptic output devices 118 can output to touch surface 116. For example, in one embodiment, touch surface 116 may comprise an image of a virtual button that has a high coefficient of friction and a virtual slider with a low coefficient of friction. In another embodiment, touch surface 116 may comprise an edge that is augmented with a haptic effect that abruptly increases the coefficient of friction from the minimum (e.g., the amount of friction when an ultrasonic actuator is operating at 100%) to the maximum (e.g., the amount of friction when the electrostatic actuator is operating at 100%). In some embodiments, because the range of the coefficient of friction is greater (e.g., a greater difference from the minimum friction to the maximum) the user may perceive a stronger haptic effect.

In some embodiments, processor 102 may utilize both an ultrasonic frequency actuator and an electrostatic actuator in order to minimize total power consumption while still maintaining a broad range of effects. For example, in one embodiment, touch surface 116 may comprise a plurality of virtual buttons set against a neutral background. In such an embodiment, some of the virtual buttons may be sensitive (e.g., available for user input) and therefore comprise a high friction so that they can be found easily against the neutral backdrop. Similarly, in such an embodiment, buttons that are insensitive (e.g., those that are not available for user input) may comprise a low friction so that they can be skipped easily. In some embodiments, the processor 102 may conserve energy by outputting effects using electrostatic friction when the user interacts with the high friction buttons, outputting effects using ultrasonic vibrations when the user interacts with the low friction buttons, and outputting no effect when the user interacts with the background. Utilizing such an implementation may enable the processor 102 to conserve energy by only outputting haptic effects when the user interacts with certain components.

Turning to memory 104, exemplary program components 124, 126, and 128 are depicted to illustrate how a device may be configured to provide perceptual normalization of haptic effects. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure, and/or other characteristics of the touch over time.

Haptic effect determination module 126 represents a program component that analyzes data regarding touch characteristics to select a haptic effect to generate. Particularly, module 126 comprises code that determines, based on the location of the touch, a simulated feature to generate on the touch surface. Module 126 may further comprise code that selects one or more haptic effects to provide in order to simulate the feature. For example, some or all of the area of touch surface 116 may be mapped to a graphical user interface. Different haptic effects may be selected based on the location of a touch in order to simulate the presence of the feature by simulating a texture on a surface of touch surface 116 so that the feature is felt when a corresponding representation of the feature is seen in the interface. However, haptic effects may be provided via touch surface 116 even if a corresponding element is not displayed in the interface (e.g., a haptic effect may be provided if a boundary in the interface is crossed, even if the boundary is not displayed).

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of texture and utilize signal processing algorithms to generate an appropriate signal to send to haptic output device 118. As a further example, a desired texture may be indicated along with target coordinates for the texture and an appropriate waveform sent to one or more actuators to generate appropriate displacement of the surface (and/or other device components) to provide the texture. Some embodiments may utilize multiple haptic output devices in concert to simulate a feature. For instance, a variation in texture may be used to simulate crossing a boundary between buttons on an interface while a vibrotactile effect simulates the response when the button is pressed.

Figure 1B:
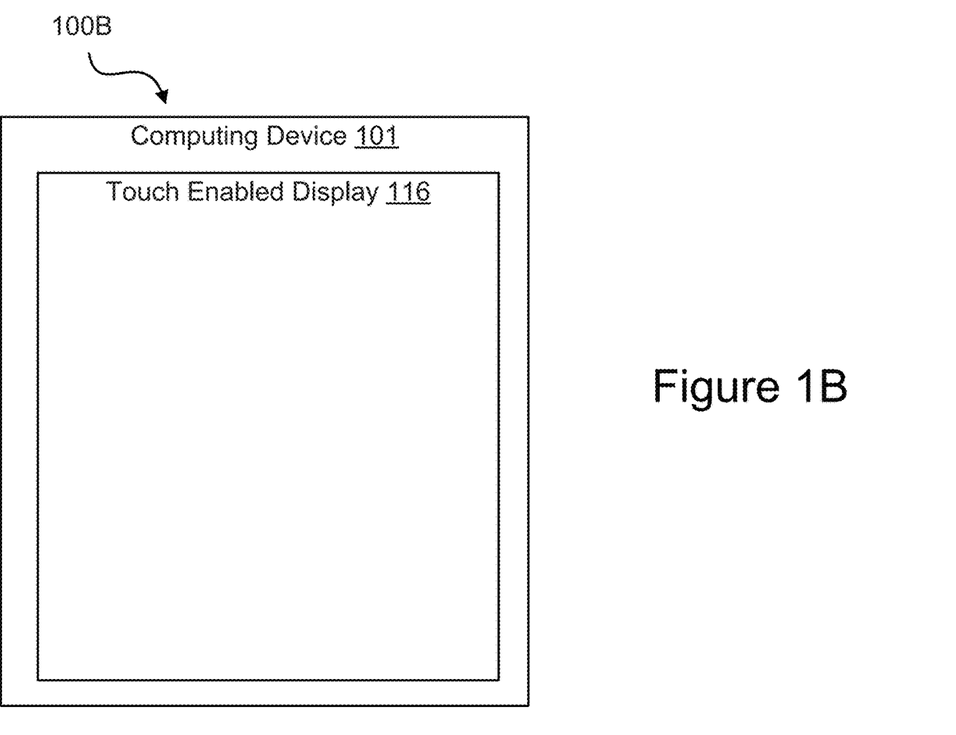
FIG. 1B shows an external view of one embodiment of the system shown in FIG. 1A.

A touch surface may or may not overlay (or otherwise correspond to) a display, depending on the particular configuration of a computing system. In FIG. 1B, an external view of a computing system 100B is shown. Computing device 101 includes a touch enabled display 116 that combines a touch surface and a display of the device. The touch surface may correspond to the display exterior or one or more layers of material above the actual display components.

Figure 1C:
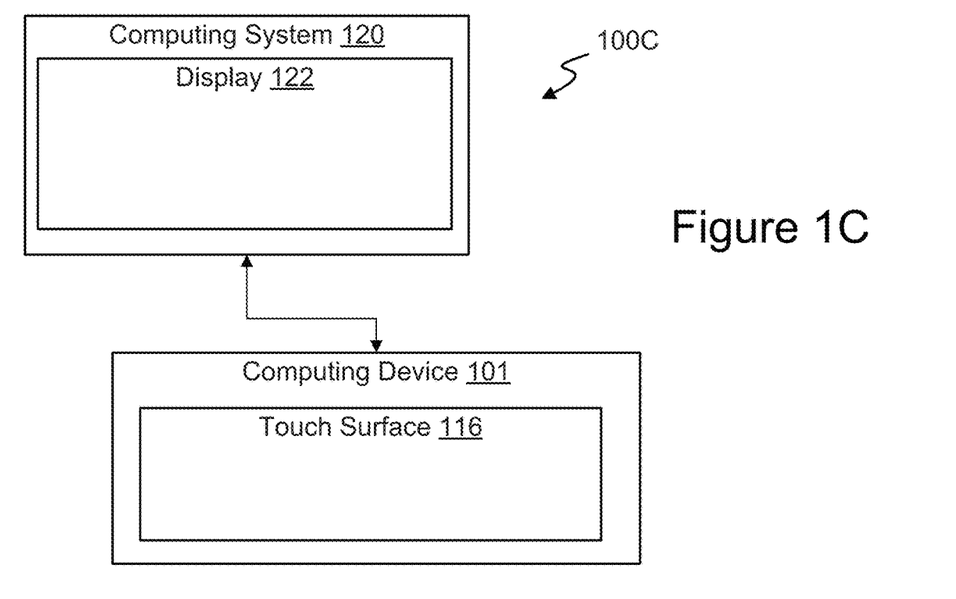
FIG. 1C illustrates an external view of another embodiment of the system shown in FIG. 1A.

FIG. 1C illustrates another example of a touch enabled computing system 100C in which the touch surface does not overlay a display. In this example, a computing device 101 features a touch surface 116 which may be mapped to a graphical user interface provided in a display 122 that is included in computing system 120 interfaced to device 101. For example, computing device 101 may comprise a mouse, trackpad, or other device, while computing system 120 may comprise a desktop or laptop computer, set-top box (e.g., DVD player, DVR, cable television box), or another computing system. As another example, touch surface 116 and display 122 may be disposed in the same device, such as a touch enabled trackpad in a laptop computer comprising display 122. Whether integrated with a display or otherwise, the depiction of planar touch surfaces in the examples herein is not meant to be limiting. Other embodiments include curved or irregular touch enabled surfaces that are further configured to provide surface-based haptic effects.

Figure 2A:
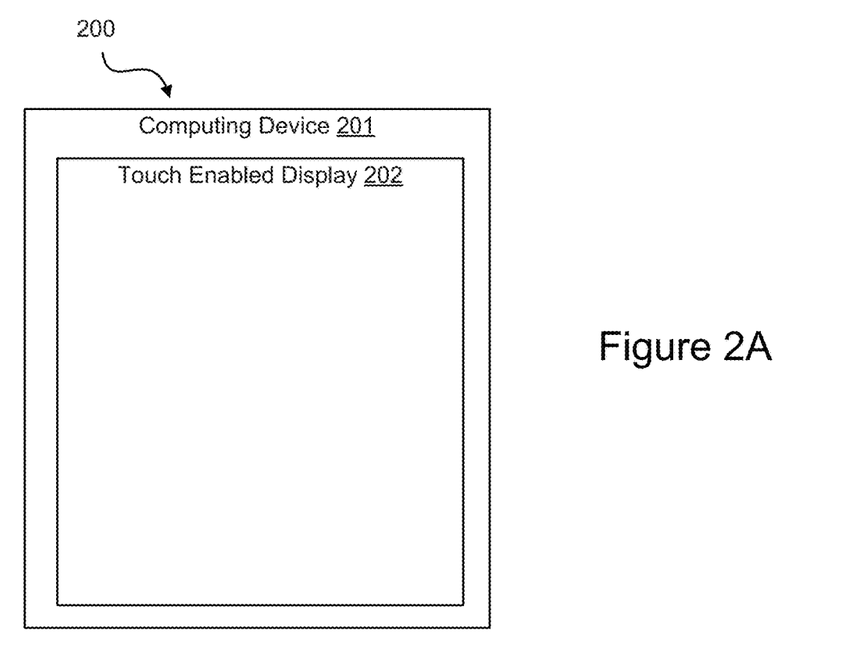
FIG. 2A illustrates an example embodiment for perceptual normalization of haptic effects.
Figure 2B:
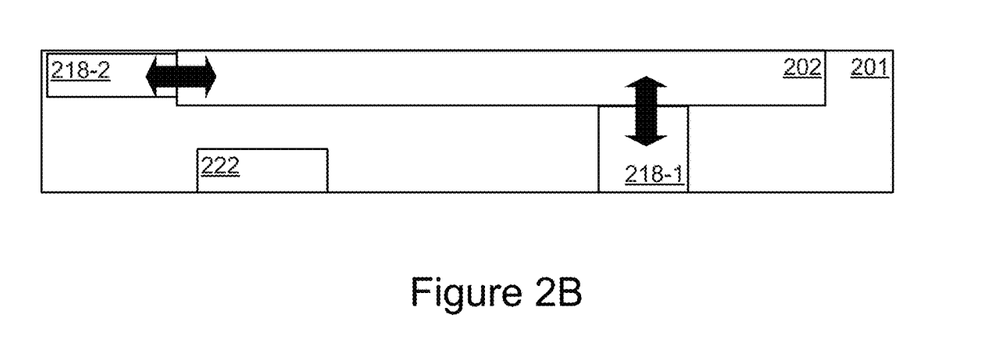
FIG. 2B illustrates an example embodiment for perceptual normalization of haptic effects.

FIGS. 2A-2B illustrate an example of devices that may provide perceptual normalization of haptic effects. FIG. 2A is a diagram illustrating an external view of a system 200 comprising a computing device 201 that comprises a touch enabled display 202. FIG. 2B shows a cross-sectional view of device 201. Device 201 may be configured similarly to device 101 of FIG. 1A, though components such as the processor, memory, sensors, and the like are not shown in this view for purposes of clarity.

As can be seen in FIG. 2B, device 201 features a plurality of haptic output devices 218 and an additional haptic output device 222. Haptic output device 218-1 may comprise an actuator configured to impart vertical force to display 202, while 218-2 may move display 202 laterally. In this example, the haptic output devices 218 and 222 are coupled directly to the display, but it should be understood that the haptic output devices 218 and 222 could be coupled to another touch surface, such as a layer of material on top of display 202. Furthermore, it should be understood that one or more of haptic output devices 218 or 222 may comprise an electrostatic actuator, as discussed above. Furthermore, haptic output device 222 may be coupled to a housing containing the components of device 201. In the examples of FIGS. 2A-2B, the area of display 202 corresponds to the touch area, though the principles could be applied to a touch surface completely separate from the display.

In one embodiment, haptic output devices 218 each comprise a piezoelectric actuator, while additional haptic output device 222 comprises an eccentric rotating mass motor, a linear resonant actuator, or another piezoelectric actuator. Haptic output device 222 can be configured to provide a vibrotactile haptic effect in response to a haptic signal from the processor. The vibrotactile haptic effect can be utilized in conjunction with surface-based haptic effects and/or for other purposes. For example, each actuator may be used in conjunction to simulate a texture or vary the coefficient of friction on the surface of display 202.

In some embodiments, either or both haptic output devices 218-1 and 218-2 can comprise an actuator other than a piezoelectric actuator. Any of the actuators can comprise a piezoelectric actuator, an electromagnetic actuator, an electroactive polymer, a shape memory alloy, a flexible composite piezo actuator (e.g., an actuator comprising a flexible material), electrostatic, and/or magnetostrictive actuators, for example. Additionally, haptic output device 222 is shown, although multiple other haptic output devices can be coupled to the housing of device 201 and/or haptic output devices 222 may be coupled elsewhere. Device 201 may comprise multiple haptic output devices 218-1/218-2 coupled to the touch surface at different locations, as well.

Figure 3A:
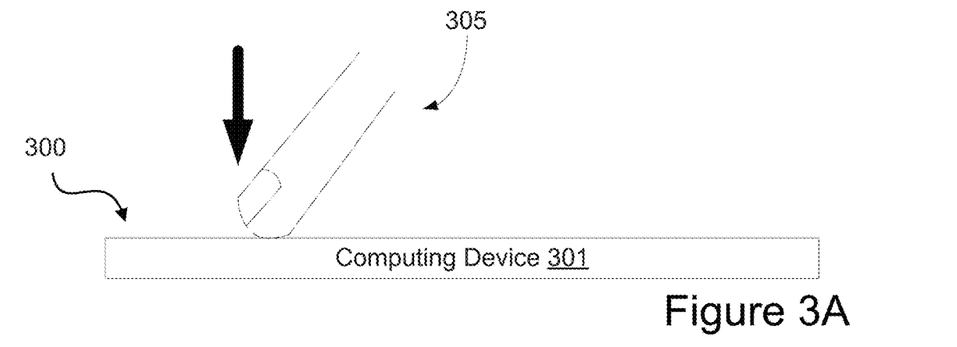
FIG. 3A illustrates another example embodiment for perceptual normalization of haptic effects.

Turning to FIG. 3A, system 300 is an illustrative example of a system for perceptual normalization of haptic effects. FIG. 3A is a diagram illustrating an external view of a system 300 comprising a computing device 301 that features a touch sensitive interface such as a touch screen or touch pad. In one embodiment, computing device 301 may comprise a multifunction controller. For example, a controller for use in a kiosk, ATM, or other computing device. Further, in one embodiment, computing device 301 may comprise a controller for use in a vehicle.

As shown in FIG. 3A, a user 305 is shown applying high pressure to computing device 301. In such an embodiment, a touch sensitive interface may detect this high pressure by detecting the area of the user's finger that is in contact with the touch sensitive interface. For example, applying more than a certain threshold of pressure to a touch screen may cause the skin on a user's finger to flatten out and cover a large portion of the touch screen. Alternatively, in some embodiments computing device 301 may comprise another type of sensor configured to detect the pressure applied by user 305.

In some embodiments, computing device 301 may then determine whether the pressure applied by the user is above a certain threshold. In some embodiments, this threshold may comprise a pressure above the level that allows the user to fully perceive the relevant haptic effect. In such an embodiment, the computing device 301 may output an alarm to alert the user to reduce the applied pressure. For example, in some embodiments computing device 301 may output an audible alarm to alert the user to press more softly on the touch sensitive interface. In another embodiment, computing device 301 may output a different haptic effect to alert the user to apply a lower level of pressure. In still other embodiments, computing device 301 may output a visual warning to alert the user 305 to press more softly. For example, in one embodiment the display may output an image configured to simulate the appearance of cracks forming or an image configured to simulate that the display is bending under the pressure.

In another embodiment, computing device 301 may modify haptic effects to compensate for the pressure the user 305 applies to the display. For example, in some embodiments computing device 301 may output haptic effects with a higher or lower frequency or intensity in order to compensate for the pressure applied by user 305. For example, in one embodiment, computing device 301 may output a higher power electrostatic friction based effect to compensate for the high pressure applied by the user 305.

Figure 3B:
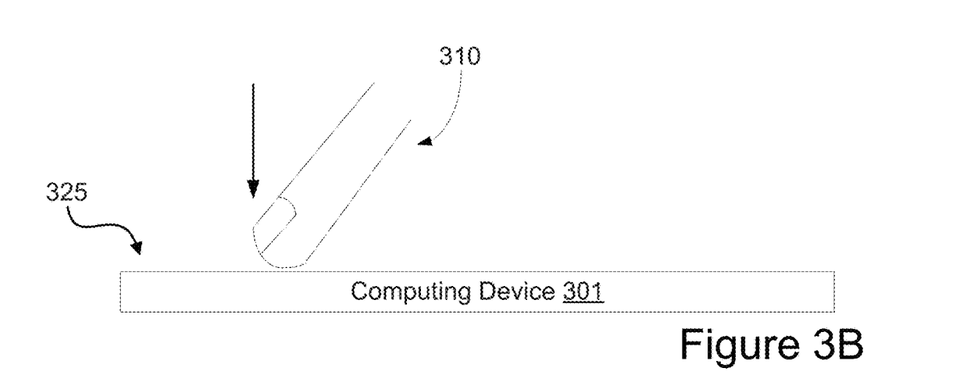
FIG. 3B illustrates another example embodiment for perceptual normalization of haptic effects.

Turning to FIG. 3B, system 325 is an example system for perceptual normalization of haptic effects. FIG. 3B is a diagram illustrating another external view of the computing device 301 described above with regard to FIG. 3A. As shown in FIG. 3B, a user 310 is shown applying very light pressure to computing device 301. In such an embodiment, a touch sensitive interface may detect this light pressure, for example, by detecting that only a small area (or none) of the user's finger is in contact with the touch sensitive interface. Alternatively, in some embodiments, computing device 301 may comprise another type of sensor configured to detect the pressure applied by user 310.

In some embodiments, computing device 301 may then determine whether the pressure applied by the user is below a certain threshold. In some embodiments, this threshold may comprise a pressure below the level that allows the user to fully perceive the relevant haptic effect. In such an embodiment, the computing device 301 may output an alarm to alert the user to increase the applied pressure. For example, in some embodiments computing device 301 may output an audible alarm to alert the user to apply more pressure on the touch sensitive interface. In another embodiment, computing device 301 may output a different haptic effect to alert the user to apply more pressure. In still other embodiments, computing device 301 may output a visual warning that the user should apply more pressure. For example, in one embodiment the display may output an image configured to simulate the appearance of the display expanding toward the user (e.g., like the outside of an inflating balloon).

In another embodiment, computing device 301 may modify haptic effects to compensate for the pressure the user applies to the touch sensitive interface. For example, in some embodiments computing device 301 may output haptic effects with a higher or lower frequency or intensity in order to compensate for the pressure applied by user 310.

For example, in one embodiment, computing device 301 may output a high-power electrostatic friction based effect to compensate for the low level pressure applied by the user 310.

In the embodiments discussed in FIGS. 3A and 3B the threshold level of pressure may be determined based on a plurality of factors. For example, in some embodiments, different types of actuators may comprise different threshold levels of pressure to perceive haptic effects. Further, in some embodiments different types of haptic effects may be associated with different thresholds. In still other embodiments, different materials may comprise different threshold levels of pressure at which haptic effects are output. In still other embodiments, environmental factors such as temperature, humidity, magnetic fields, electric fields, other vibrations, or noises may impact the threshold.

Further, in the embodiments discussed above, the intensity of the haptic effect may also be modulated as the pressure applied by the user varies. For example, in one embodiment, as the user applies less pressure, the computing device may output a lower powered haptic effect. Similarly, in one embodiment, as the user applies additional pressure the computing device may output a higher power haptic effect. In still another embodiment, the computing device may stop varying the haptic effect once the pressure applied by the user is in a range for full perception of the intended haptic effect. Similarly, in some embodiments, computing device may output an alarm or haptic effect to alert the user that he or she is applying the appropriate amount of pressure.

Figure 4:
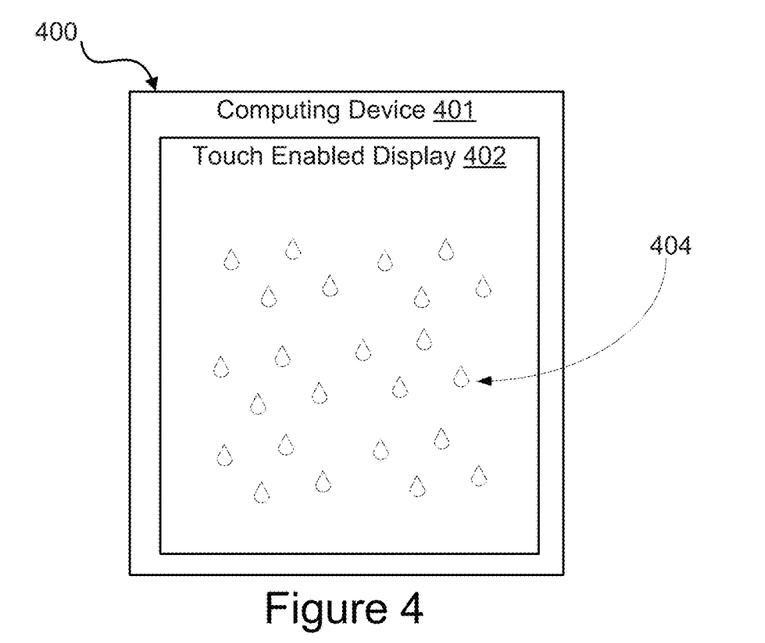
FIG. 4 illustrates another example embodiment for perceptual normalization of haptic effects.

Turning now to FIG. 4, FIG. 4 shows system 400 which comprises a computing device 401 with a touch enabled display 402. In some embodiments computing device 401 may comprise a handheld computing device, e.g., a mobile phone, a tablet, a music player, or a laptop computer. In another embodiment, computing device 401 may comprise a multifunction controller. For example, a controller for use in a kiosk, ATM, or other computing device. Further, in one embodiment, computing device 401 may comprise a controller for use in a vehicle.

As shown in FIG. 4, touch enabled display 402 comprises moisture 404. In some embodiments, moisture 404 may comprise condensation on the surface of touch enabled display 402. In other embodiments, moisture 404 may not by physically present on the surface of touch enabled display 402, but may instead comprise ambient moisture in the environment. In some embodiments, the humidity may be detected by sensor(s) 130 of the type describe above with regard to FIG. 1.

Based on the detected humidity, computing device 401 may determine modified haptic effects in order to compensate for the humidity. In some embodiments, these modified haptic effects may allow the user to perceive the intended haptic effect. For example, in some embodiments, higher intensity vibrotactile effects may be output to compensate for variations in the detected humidity. For example, in one embodiment, computing device 401 may detect a very high ambient humidity and accordingly may output higher intensity vibrotactile effects. In other embodiments, users may perceive haptic effects differently based on the ambient humidity. Further, in some embodiments, factors such as environmental conditions may distract the user from haptic effects. Thus, in some embodiments, computing device 401 may be configured to select different actuators based on environmental conditions, such as the ambient humidity.

Figure 5:
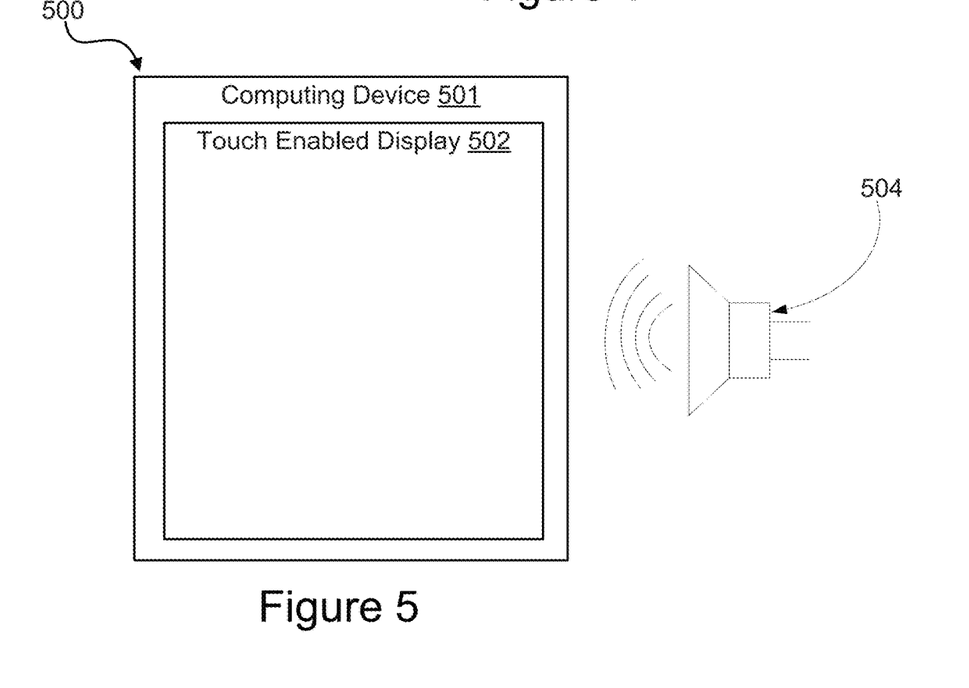
FIG. 5 illustrates another example embodiment for perceptual normalization of haptic effects.

Turning now to FIG. 5, FIG. 5 shows a system 500 comprising a computing device 501 with a touch enabled display 502. Computing device 501 may comprise a similar computing device to that described above with regard to FIG. 4.

As shown in FIG. 5, system 500 further comprises a disruption 504. In some embodiments, disruption 504 may comprise a source of ambient noise, such as a siren, speakers, music, the noise made by a crowd, background noise (e.g., a HVAC system, a car, train, airplane, TV, neighbors, or a pet), or some other source of noise. In another embodiment, disruption 504 may comprise a source of ambient vibrations. For example, in some embodiments, disruption 504 may comprise vibrations experienced on a train, airplane, car, bus, boat, treadmill or other exercise equipment, or while walking. Further, in some embodiments, rather than directly impacting the haptic effect, disruption 504 may instead distract the user from fully perceiving the haptic effect.

In some embodiments, computing device 501 may comprise a sensor configured to detect disruption 504. And based on a sensor signal received from this sensor, computing device 501 may determine a modified haptic effect. In some embodiments, this modified haptic effect may be configured to cause the user to continue perceiving a certain haptic effect. For example, in one embodiment, computing device 501 may comprise a mobile device in a moving car. In such an embodiment, computing device 501 may output an electrostatic friction based effect. However, as the car moves past a loud siren (e.g., the siren of a fire truck) the noise may impact the user's perception of the haptic effect. For example, in one embodiment, the user may perceive a weaker haptic effect due to the ambient noise of the fire truck. Thus, in such an embodiment, computing device 501 may determine a modified haptic effect configured to compensate for the siren. For example, computing device 501 may output a higher voltage electrostatic effect so the user continues to perceive the original haptic effect despite the interference caused by the noise. Similarly, in other embodiments computing device 501 may determine modified haptic effects configured to compensate for ambient vibrations, such as if the car goes over a rough patch of road.

Illustrative Methods for Providing Perceptual Normalization of Haptic Effects

Figure 6:
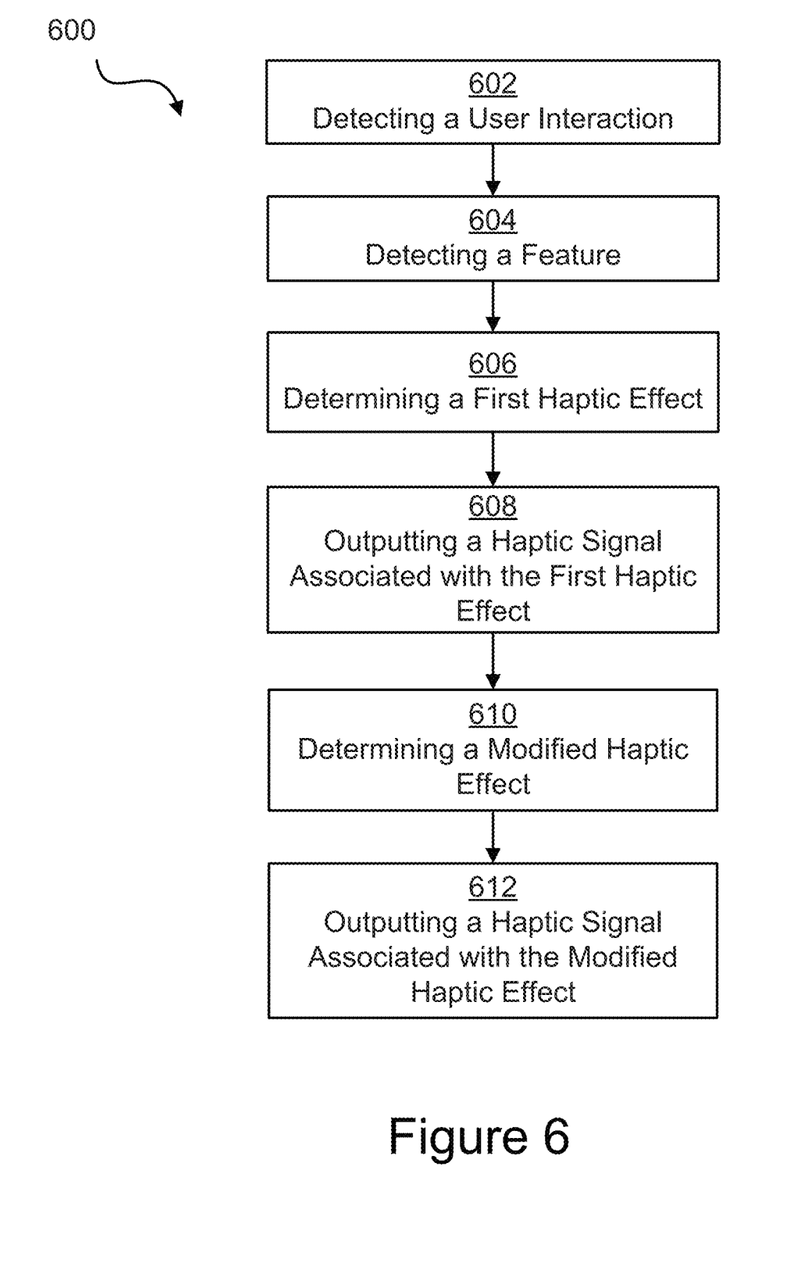
FIG. 6 is a flow chart for a method for performing perceptual normalization of haptic effects according to one embodiment.

FIG. 6 is a flowchart showing an illustrative method 600 for providing perceptual normalization of haptic effects. In some embodiments, the steps in FIG. 6 may be implemented in program code executed by a processor, for example, the processor in a general purpose computer, mobile device, or server. In some embodiments, these steps may be implemented by a group of processors. In some embodiments the steps shown in FIG. 6 may be performed in a different order. Alternatively, in some embodiments, one or more of the steps shown in FIG. 6 may be skipped, or additional steps not shown in FIG. 6 may be performed. The steps below are described with reference to components described above with regard to system 100 shown in FIG. 1.

The method 400 begins when sensor 108 detects an interaction with a touch surface 602. Sensor 108 may comprise one or more of a plurality of sensors known in the art, for example, resistive and/or capacitive sensors may be embedded in touch surface 116 and used to determine the location of a touch and other information, such as pressure. As another example, optical sensors with a view of the touch surface may be used to determine the touch position. In still other embodiments, sensors 108 and touch surface 116 may comprise a touch screen display.

The method 600 continues when sensor 116 detects a feature 604. In some embodiments the feature may comprise a feature associated with touch surface 116. In some embodiments the feature may comprise a feature that impacts a user's perception of a haptic effect output onto touch surface 116 by haptic output device(s) 118. For example, in one embodiment, the feature may comprise the pressure the user applies to the touch surface 116. In such an embodiment, sensor 130 may detect the downward pressure the user applies to the touch surface 116. In another embodiment, sensor 130 may detect the area of the user's contact with touch surface 116 (e.g., how many square cm of contact the user's finger makes with the touch surface 116.). In another embodiment, sensor 130 may comprise a motion sensor (e.g., a GPS sensor, accelerometer, or sensor to detect speed). In still another embodiment, sensor 130 may comprise an environmental sensor, e.g., a temperature sensor, a humidity sensor, an atmospheric pressure sensor, an electric field sensor, a magnetic field sensor, a wind speed sensor, or some other sensor configured to detect the current environmental conditions around the device 101. In another embodiment, sensor 130 may comprise a network interface configured to receive data from a remote database. For example, in one embodiment, sensor 130 may comprise a network interface configured to receive environmental data from an environmental database, such as a weather service. In another embodiment, sensor 130 may comprise a network interface configured to access a database of data associated with one or more of a plurality of the factors discussed above. In still another embodiment sensor 130 may comprise a force sensor, for example, a sensor configured to detect the frictional force the user applies to the surface of a touch sensitive interface. In still other embodiments, rather than an independent component, sensor 130 may comprise another sensor used by device 101, e.g., sensor 130 may comprise one of I/O components 112, touch surface 116, sensor(s) 108, or haptic output device(s) 118.

In some embodiments, factors may be distracting to the user, and therefore impact (e.g., reduce or increase) the user's perception of the haptic effect. For example, in some embodiments, audible noises, vibrations, environmental factors, accelerations, or other factors may be distracting to the user, and therefore impact (e.g., reduce or increase) the user's perception of the haptic effect. In other embodiments, the factor may directly impact that haptic effect (e.g., moisture on the surface of touch surface 116 may impact friction based haptic effects).

The method 600 continues when processor 102 determines a first haptic effect 606. In some embodiments, the first haptic effect may comprise a variation in the coefficient of friction on touch surface 116. In other embodiments, the haptic effect may comprise a simulated texture on the surface of touch surface 116 (e.g., the texture of one or more of: water, grass, ice, metal, sand, gravel, brick, fur, leather, skin, fabric, rubber, leaves, or any other available texture). In some embodiments, processor 102 may rely on programming contained in haptic effect determination module 126 to determine the haptic effect. For example, the processor 102 may access drive signals stored in memory 104 and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

Further, in some embodiments, users may be able to select a texture or other haptic effect in order to customize computing device 101. For example, in some embodiments, a user may select a haptic effect such as a surface texture to allow for personalization of the feel of a touch interface. In some embodiments, the user may select these personalized haptic effects or surface textures through modifying settings or downloading software associated with particular effects. In other embodiments, the user may designate effects through detected interaction with the device. In some embodiments, this personalization of haptic effects may increase the user's sense of ownership and the connection between the user and his or her device.

In still other embodiments, device manufacturers or software developers may select distinctive haptic effects, such as surface textures, to brand their devices or user interfaces. In some embodiments, these haptic effects may be unique to branded devices and similar to other distinctive elements that may increase brand awareness. For example, many mobile devices and tablets may comprise a custom or branded home screen environment. For example, in some embodiments, devices produced by different manufacturers may still comprise the same operating system; however, manufacturers may distinguish their devices by modifying this home screen environment. Thus, in some embodiments, some device manufacturers or software developers may use haptic effects such as textures or friction based effects either in home screens or in other user interfaces to create a unique and differentiated user experience.

The method 600 continues when processor 102 outputs a haptic signal associated with the first haptic effect 608. The processor 102 outputs the haptic signal to a haptic output device 118 configured to output the haptic effect. In some embodiments, haptic output device 118 may output the haptic effect onto touch surface 116. In some embodiments haptic output device 118 may comprise traditional actuators such as piezoelectric actuators or electric motors coupled to touch surface 116 or other components within computing device 101. In other embodiments haptic output device 118 may comprise electrostatic actuators configured to simulate textures or vary coefficients of friction using electrostatic fields. In some embodiments, processor 102 may control a plurality of haptic output devices to simulate multiple haptic effects. For example, in one embodiment, processor 102 may control an electrostatic actuator to simulate a texture on the surface of touch surface 116 and processor 102 may further control other haptic output devices 118 to simulate other features. For example, haptic output devices 118 may comprise actuators configured to output other effects, such as vibrations configured to simulate barriers, detents, movement, or impacts on touch surface 116. In some embodiments, processor 102 may coordinate the effects so the user can feel a plurality of effects together when interacting with touch surface 116.

The method 600 continues when processor 102 determines a modified haptic effect 610. In some embodiments, the modified haptic effect may comprise a haptic effect configured to compensate for the feature discussed above with regard to stage 604. For example, in some embodiments the modified haptic effect may comprise a haptic effect of a different intensity or frequency than the first haptic effect. In some embodiments, this different intensity or frequency may be configured to cause the user to perceive substantially the same haptic effect despite the impact of the feature. For example, if the feature comprises the user accelerating rapidly, the modified haptic effect may comprise a varied intensity haptic effect to compensate for this acceleration.

Further, in some embodiments that implement electrostatic based effects, the power required to fully perceive the effect may be associated with the quality of the connection between the user and electrical ground. For example, in some embodiments when the user does not have a good connection to electrical ground, e.g., when the user's connection to electrical ground is through a rubber pad, plastic chair, or some other poor electrical conductor, the haptic effect may need to be output at a very high power. In other embodiments, when the user has a good connection to ground, e.g., because the user's connection to ground is through a strong conductor, e.g., a metal chair, the haptic effect may need to be at a much lower power e.g., half the power of when the user did not have a good connection to electrical ground.

Further, in some embodiments, the modified haptic effect may comprise a determination by the processor to use one or more different types of actuators. For example, in some embodiments, haptic output device 118 may comprise both an electrostatic actuator and an ultrasonic frequency actuator. In such an embodiment, processor 102 may be configured to determine whether an ultrasonic frequency actuator or an electrostatic actuator will be more efficient for outputting a certain type of haptic effect. For example, in one embodiment, due to environmental conditions such as ambient electric fields or high humidity; an ultrasonic frequency actuator may be more efficient at outputting a specific haptic effect. In such an embodiment, the processor 102 may make this determination, for example, based on a sensor signal received from sensor(s) 130.

The method 600 continues when processor 102 outputs a haptic signal associated with the modified haptic effect 612. The processor 102 outputs the haptic signal to a haptic output device 118 configured to output the haptic effect. In some embodiments, the haptic output device comprises the same type of haptic output device that output the first haptic effect. In other embodiments, the haptic output device comprises a different haptic output device. For example, in one embodiment, the first haptic effect may be output by an actuator configured to output an electrostatic friction based effect. In such an embodiment, the modified haptic effect may comprise an effect output by an ultrasonic frequency actuator. In other embodiments, both the first haptic effect and the modified haptic effect may be output by the same haptic output device (e.g., both the first haptic effect and the modified haptic effect may be output by an ultrasonic frequency actuator).

Other Illustrative Embodiments of Perceptual Normalization of Haptic Effects

Figure 7:
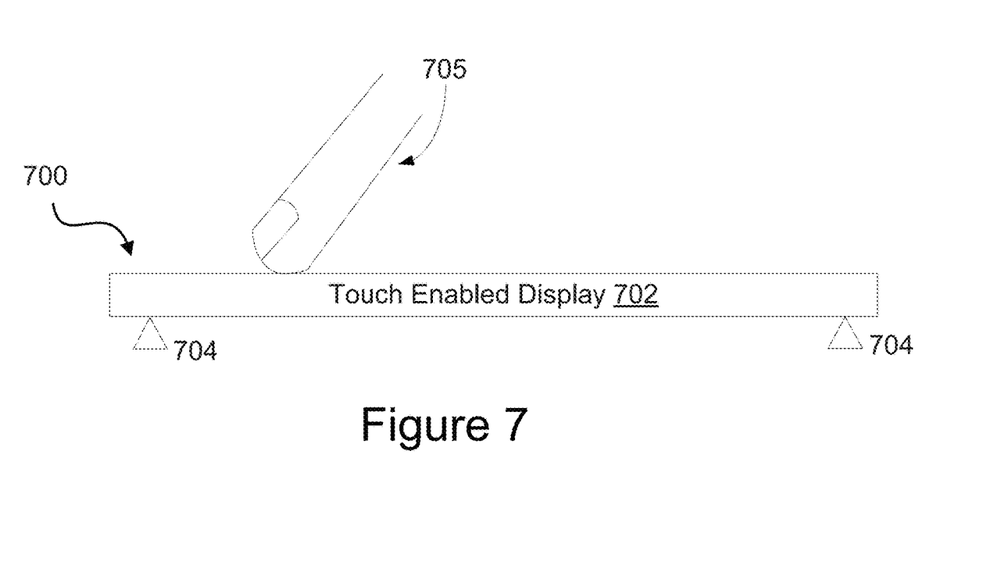
FIG. 7 illustrates another example embodiment for perceptual normalization of haptic effects.

FIG. 7 illustrates an example embodiment of perceptual normalization of haptic effects. As shown in FIG. 7, the system 700 shows a touch enabled display 702 and two force sensors 704. In some embodiments, touch enabled display 702 may comprise a component of a computing device of the type described above. In the embodiment shown in FIG. 7, as the user interacts with touch enabled display 702, force sensors 704 detect the force applied by the user. For example, in some embodiments, force sensors 704 are configured to detect the force the user applies onto the surface of touch enabled display 702. In other embodiments, force sensors 704 are configured to detect the force the user applies in the plane normal to the surface of touch enabled display 702. In some embodiments, the lateral force and the normal force may be used together to determine the frictional force between the user 705 and the surface of touch enabled display 702. In some embodiments, a computing device associated with touch enabled display may use this force determination to vary friction or texture based haptic effects to compensate for features of the type discussed above (e.g., environmental features).

Figure 8:
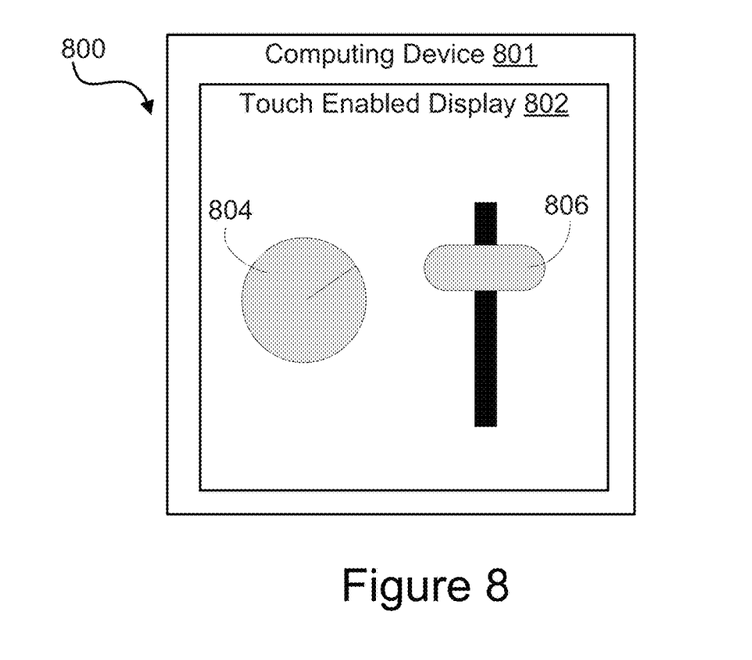
FIG. 8 illustrates another example embodiment for perceptual normalization of haptic effects.

Turning now to FIG. 8, FIG. 8 is a diagram illustrating an external view of a system 800 comprising a computing device 801 that comprises a touch enabled display 802. In some embodiments, computing device 801 comprises a computing device of the type discussed in the preceding paragraphs.

As shown in FIG. 8, touch enabled display 802 shows two different controls 804 and 806, which may comprise, for example, Radio Controls. In such an embodiment, computing device 802 may be configured to control the radio of a vehicle. For example, controller 804 may comprise an image of a knob configured to control settings on a radio, i.e., a knob to tune the radio station, select a new song, or adjust the volume of the radio. Similarly, controller 806 may comprise an image of a slider configured to adjust another feature of the radio.

In some embodiments, computing device 801 may be configured to output haptic effects when the user touches or moves each of controls 804 and 806. For example, in one embodiment, when the user touches knob 804 computing device 801 may output a certain haptic effect configured to let the user know that he or she is touching knob 804. Similarly, in such an embodiment, when the user touches slider 806 computing device 801 may output a certain haptic effect configured to let the user know that he or she is touching slider 806.

In some embodiments, the computing device 801 may comprise two or more types of haptic output devices. In some embodiments, the processor may determine which haptic output device to use based on the type of effect. For example, in one embodiment, knob 804 may be associated with a high coefficient of friction and slider 806 may be associated with a low coefficient of friction. In such an embodiment, computing device 801 may switch between an ultrasonic frequency actuator and an electrostatic actuator in order to minimize total power consumption while still maintaining a broad range of effects. For example, computing device 801 may output power to the electrostatic actuator only when the user is interacting with knob 804. Similarly, computing device 801 may output power to the ultrasonic frequency actuator only when the user is interacting with slider 806.

Advantages of Perceptual Normalization of Haptic Effects

There are numerous advantages of perceptual normalization of haptic effects. For example, in some embodiments perceptual normalization may lead to more compelling haptic effects. Users may grow accustomed to the feel of certain effects. For example, a user may expect that a certain icon will have a known feel. This may enable the user to interact with that icon while not focusing visually on a touch enabled display (e.g., while driving). However, depending on environmental and other factors the user may not always perceive the same haptic effect. Accordingly, embodiments of the present disclosure solve this problem by compensating for these factors to provide the user with a haptic effect that the user may perceive as non-changing despite the changing conditions.

Further, embodiments of perceptual normalization of haptic effects may lead to power conservation, because multiple different haptic output device may be selected based on the present conditions. This may enable a device to both have a broader range of available haptic effects, and also enable the device to select the most energy efficient actuator for a specific effect and condition. This may impact the overall battery life of mobile devices, and increase users' pleasure when using devices that incorporate one or more embodiments of the present disclosure.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system for outputting haptic effects comprising:
   a first sensor configured to detect a user interaction with a touch surface and transmit a first sensor signal associated with the user interaction;
   a second sensor configured to detect a feature associated with the touch surface, wherein the feature comprises a substance on a surface of the touch surface, and to transmit a second sensor signal associated with the feature;
   a processor in communication with the first sensor and the second sensor, the processor configured to:
     determine a first haptic effect based on the user interaction;
     determine a modified haptic effect based in part on the first haptic effect and the feature;
     output a haptic signal associated with the modified haptic effect; and
   a haptic output device in communication with the processor and coupled to the touch surface, the haptic output device configured to receive the haptic signal and output the modified haptic effect to the touch surface.

2. The system of claim 1, wherein the feature further comprises a quality of the user's connection to electrical ground.

3. The system of claim 1, wherein the feature further comprises a pressure applied to the touch surface.

4. The system of claim 1, wherein the feature further comprises an area of contact on the touch surface.

5. The system of claim 1, wherein the feature further comprises an audible noise.

6. The system of claim 1, wherein the feature further comprises a feature associated with one or more of: a temperature of the touch surface, a detection of moisture on the touch surface, a cover on the touch surface, an acceleration of the touch surface, or a condition of a user.

7. The system of claim 6, wherein the condition of the user comprises one or more of: a temperature of the user's finger, moisture on the user's finger, a substance on the user's finger, a moisture of the user's skin, or a barrier to the user's finger.

8. The system of claim 6, wherein the feature further comprises an environmental condition.

9. The system of claim 8, wherein the environmental condition comprises one or more of: a measured humidity, a measured temperature, a measured atmospheric pressure, a measured magnetic field, a measured electrical field, a measured vibration, or a measured windspeed.

10. The system of claim 1, wherein the haptic output device comprises an actuator configured to output a vibration at an ultrasonic frequency.

11. The system of claim 1, wherein the haptic output device comprises an actuator configured to generate an electrostatic field.

12. The system of claim 1, wherein the modified haptic effect comprises a higher intensity than the first haptic effect.

13. The system of claim 1, wherein the haptic output device comprises a first haptic output device and a second haptic output device, and wherein the first haptic effect is output by the first haptic output device and the modified haptic effect is output by the second haptic output device.

14. A method for outputting haptic effects comprising:
    detecting a user interaction with a touch surface;
    detecting a feature associated with the touch surface, wherein the feature comprises a substance on a surface of the touch surface;
    determining a first haptic effect based on the user interaction;
    determining a modified haptic effect based in part on the feature and the first haptic effect;
    outputting a haptic signal associated with the modified haptic effect; and
    outputting the modified haptic effect to the touch surface by a haptic output device coupled to the touch surface.

15. The method of claim 14, wherein the feature further comprises a quality of the user's connection to electrical ground.

16. The method of claim 14, wherein the feature further comprises a pressure applied to the touch surface.

17. The method of claim 14, wherein the feature further comprises an area of contact on the touch surface.

18. The method of claim 14, wherein the feature further comprises a feature associated with one or more of: a temperature of the touch surface, a detection of moisture on the touch surface, a cover on the touch surface, an acceleration of the touch surface, or a condition of a user.

19. The method of claim 17, wherein the condition of the user comprises one or more of: a temperature of the user's finger, moisture on the user's finger, a substance on the user's finger, a moisture of the user's skin, or a barrier to the user's finger.

20. The method of claim 14, wherein the feature further comprises an audible noise.

21. The method of claim 14, wherein the feature further comprises an environmental condition.

22. The method of claim 20, wherein the environmental condition comprises one or more of: a measured humidity, a measured temperature, a measured atmospheric pressure, a measured magnetic field, a measured electrical field, a measured vibration, or a measured windspeed.

23. The method of claim 14, wherein the modified haptic effect comprises a higher intensity than the first haptic effect.

24. A non-transitory computer readable medium comprising program code, which when executed by a processor is configured to cause the processor to:
    detect a user interaction with a touch surface;
    detect a feature associated with the touch surface, wherein the feature comprises a substance on a surface of the touch surface;
    determine a first haptic effect based on the user interaction;
    determine a modified haptic effect based in part on the feature and the first haptic effect;
    output a haptic signal associated with the modified haptic effect; and
    output the modified haptic effect to the touch surface.

* * * * *